Figure 1:
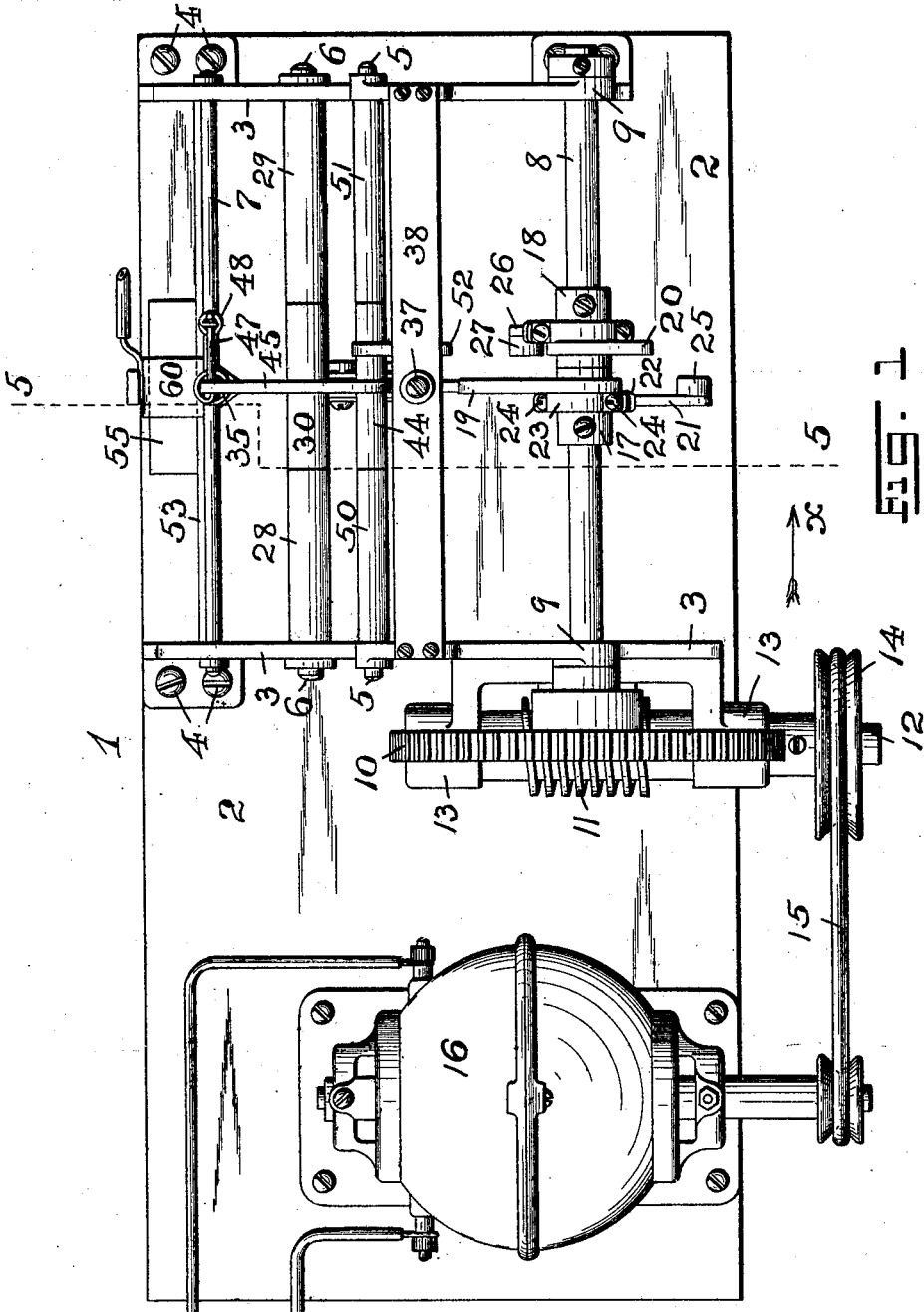

No. 760,209. PATENTED MAY 17, 1904.
P. H. JAEHNIG.
CIRCUIT CONTROLLER.
APPLICATION FILED MAR. 1, 1904.
NO MODEL. 6 SHEETS—SHEET 1.

WITNESSES: INVENTOR:
Geo. D. Richards, Paul H. Jaehnig,
N. B. Fraentzel BY
Fred K. Fraentzel,
ATTORNEY No. 760,209. PATENTED MAY 17, 1904.
P. H. JAEHNIG.
CIRCUIT CONTROLLER.
APPLICATION FILED MAR. 1, 1904.
NO MODEL. 6 SHEETS—SHEET 2.

WITNESSES: Geo. D. Richards
N. B. Fraentzel

INVENTOR: Paul H. Jaehnig,
BY Fred C. Fraentzel,
ATTORNEY

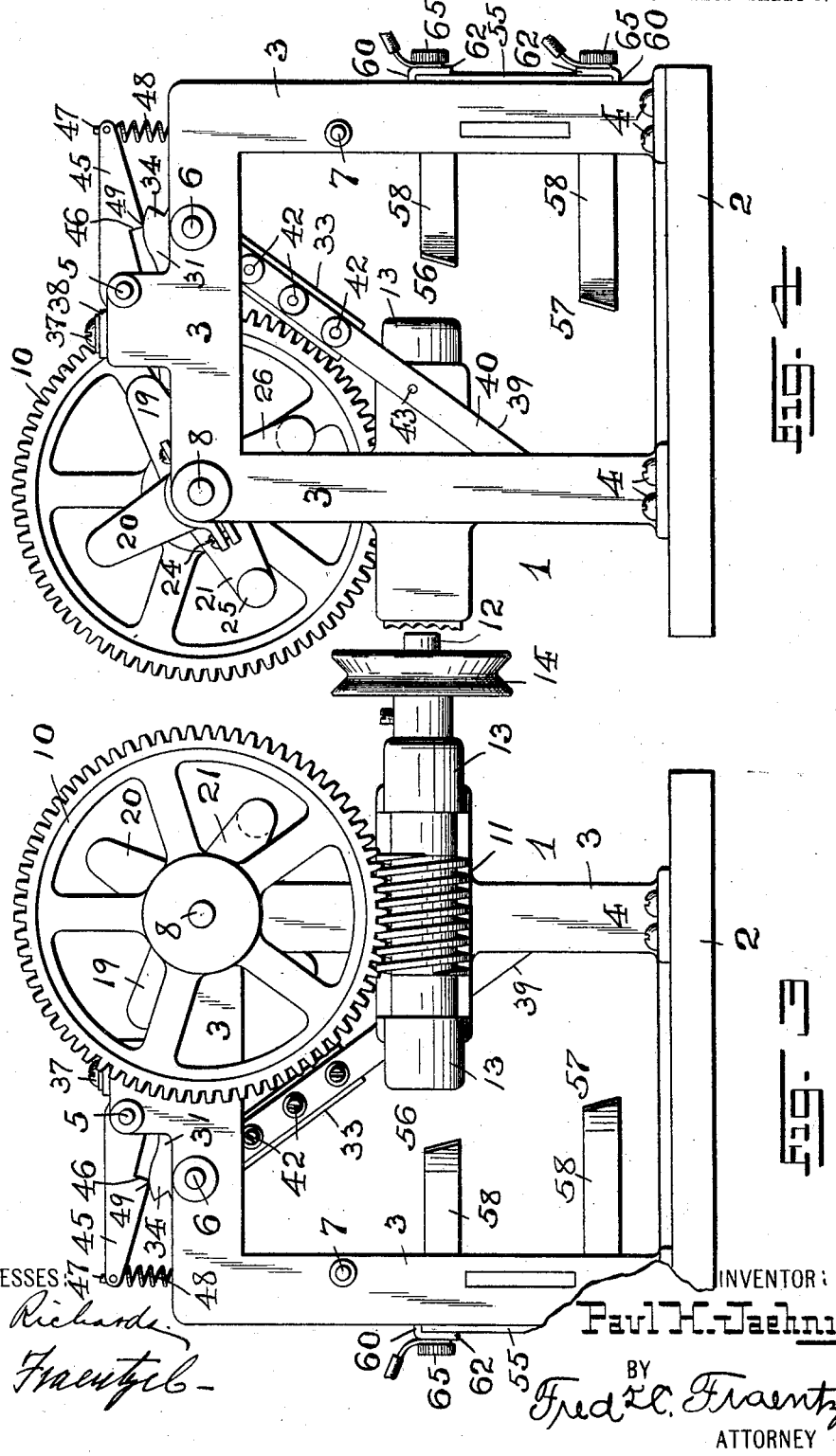

No. 760,209. PATENTED MAY 17, 1904.
P. H. JAEHNIG.
CIRCUIT CONTROLLER.
APPLICATION FILED MAR. 1, 1904.
NO MODEL. 6 SHEETS—SHEET 4.
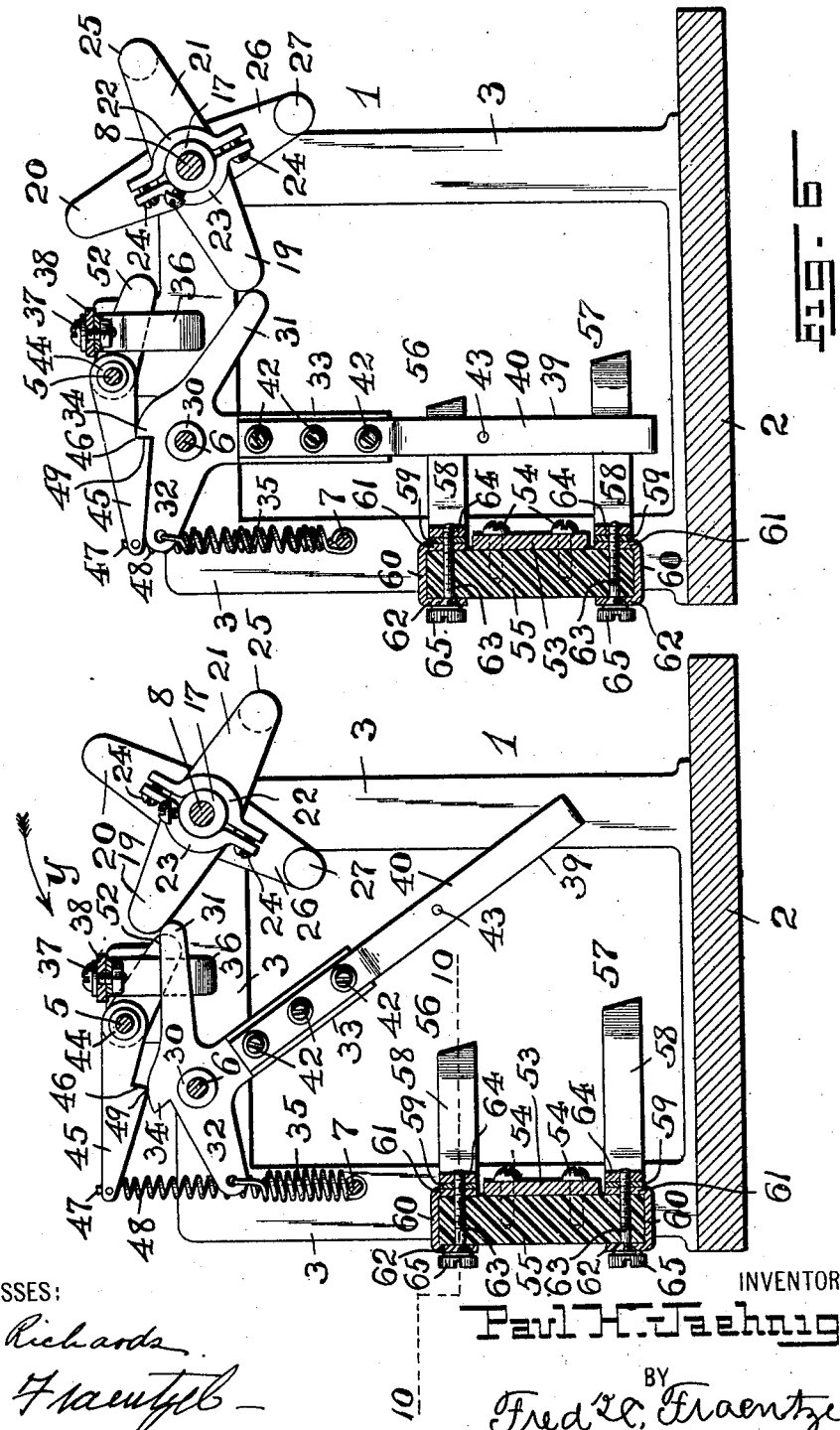
WITNESSES:
Geo. D. Richards
W. B. Fraentzel
INVENTOR:
Paul H. Jaehnig,
BY
Fred W. Fraentzel,
ATTORNEY No. 760,209. PATENTED MAY 17, 1904.
P. H. JAEHNIG.
CIRCUIT CONTROLLER.
APPLICATION FILED MAR. 1, 1904.
NO MODEL. 6 SHEETS—SHEET 5.
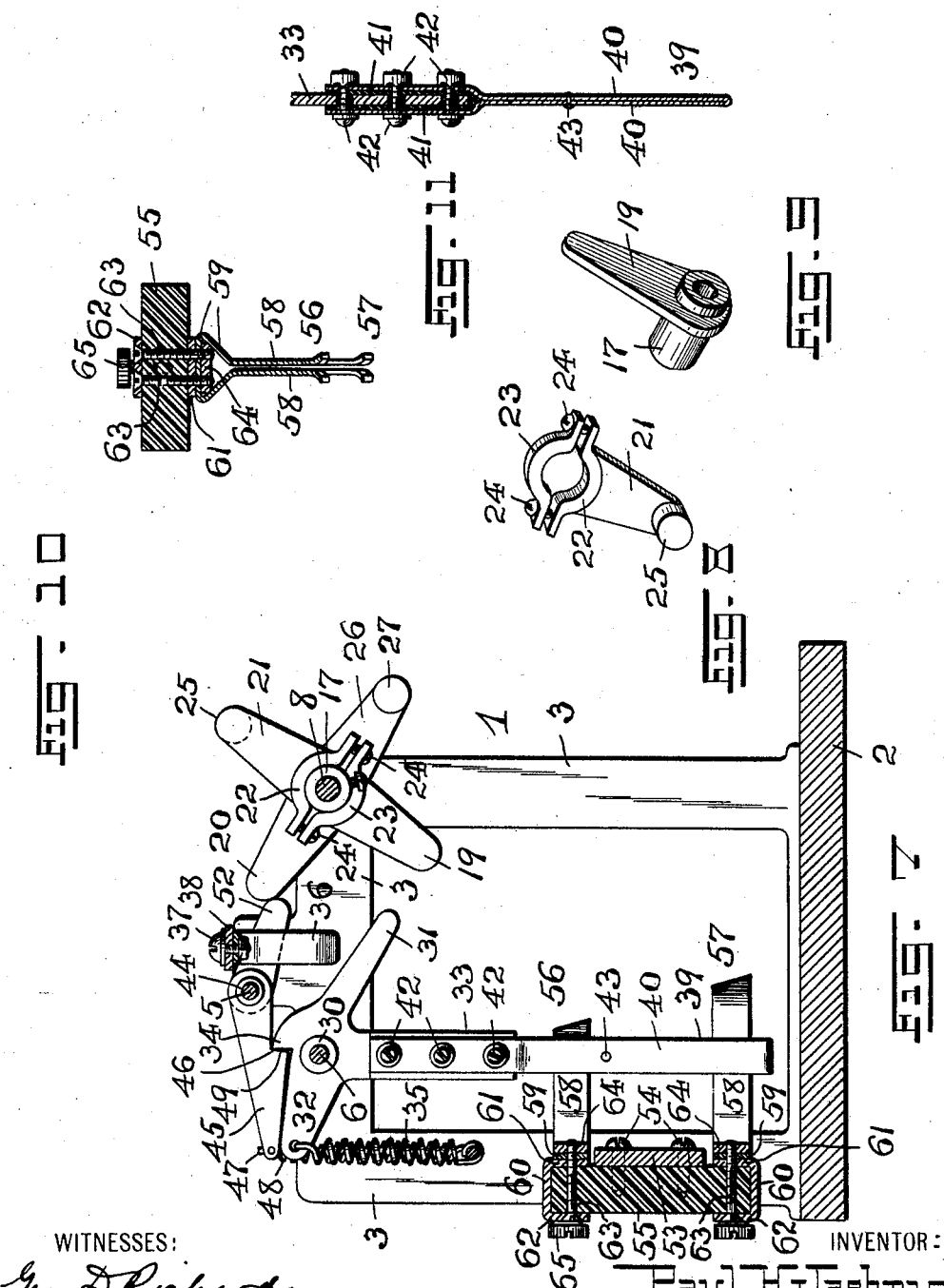
WITNESSES:
Geo. D. Richards
N. B. Fraentzel
INVENTOR:
Paul H. Jaehnig,
BY
Fred C. Fraentzel,
ATTORNEY

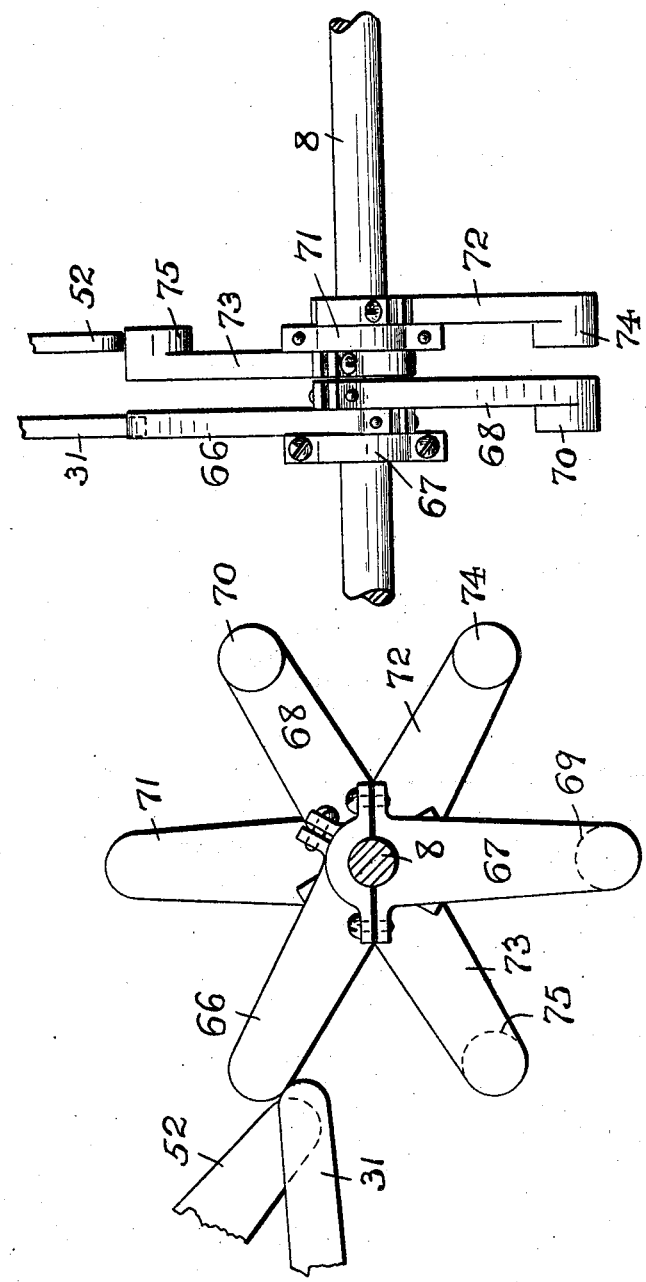

No. 760,209.　　　　　　　　　　　　　　　　　　　　　　Patented May 17, 1904.

UNITED STATES PATENT OFFICE.

PAUL H. JAEHNIG, OF NEWARK, NEW JERSEY, ASSIGNOR TO THE ELECTRIC MOTOR & EQUIPMENT CO., A CORPORATION OF NEW JERSEY.

CIRCUIT-CONTROLLER.

SPECIFICATION forming part of Letters Patent No. 760,209, dated May 17, 1904.

Application filed March 1, 1904. Serial No. 195,987. (No model.)

*To all whom it may concern:*

Be it known that I, PAUL H. JAEHNIG, a citizen of the United States, residing at Newark, in the county of Essex and State of New Jersey, have invented certain new and useful Improvements in Circuit-Controllers; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference to a novel construction of circuit-controller for automatically lighting and extinguishing one or more electric lamps to direct the current to such lamps forming the letters of an illuminated sign or other electrical illumination for displaying varying effects.

My present invention has for its principal object to provide a single-pole circuit-controller of a very simple construction and one in which the actuating parts have been reduced to a minimum.

A further object of the present invention is to provide a single-pole circuit-controller preferably having a double make and break, the arrangement of the mechanism being such that there are but few parts, which parts are positive in their action, there being no live parts in motion, and which requires but little power for driving the same. In fact, it is one of the objects of my invention to provide a circuit-controller which is especially suitable for two hundred and twenty volts and three amperes or for one hundred and ten volts and six amperes.

A still further object of this invention is to provide a circuit-controller of the character hereinafter more particularly specified having a specially-constructed switch-blade and specially-constructed contacts which are readily removable, means for providing a positive lock of the blade-carrier, an arrangement of common support for the springs, and a novel arrangement of adjustable cam or contact making and breaking arms, all with a view of simplifying the construction of and producing an effectively-operating circuit-controller.

Other objects of this invention not at this time more particularly specified will be clearly understood from the following detailed description of the apparatus or device which embodies the principles of this invention.

The present invention consists, primarily, in the novel construction of circuit-controller hereinafter set forth; and, furthermore, this invention consists in the various arrangements and combinations of devices and parts, as well as in the details of the construction thereof, all of which will be described in detail in the following specification and then finally embodied in the clauses of the claim, which are appended to and form an essential part of this specification.

The invention is clearly illustrated in the accompanying drawings, in which—

Figure 2:
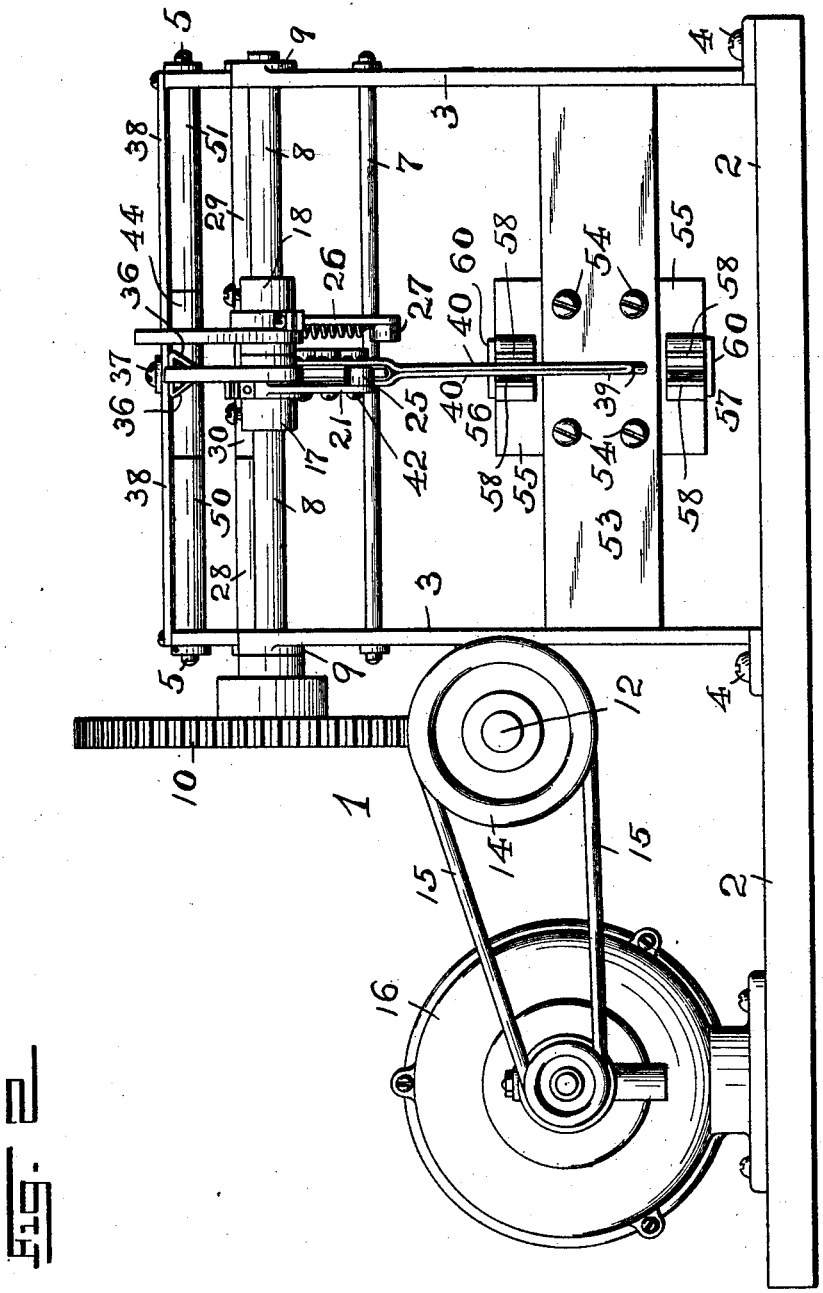

Figure 1 is a plan view of a circuit-controller embodying the principles of the present invention. Fig. 2 is a front elevation of the same, and Figs. 3 and 4 are end elevations of the two ends of the apparatus. Fig. 5 is a transverse vertical section of the apparatus, taken on line 5 5 in Fig. 1, looking in the direction of the arrow $x$, the said view representing the parts in their normal initial positions when the switch-blade is disengaged from electrical connection with the contacts of the controller. Fig. 6 is a similar sectional representation of the apparatus, but illustrating the switch-blade positively locked in its electrical connection with the contacts of the controller; and Fig. 7 is another similar transverse section illustrating the position of a cam or break arm about to engage with the locking device which holds the said switch-blade in its electrical connection with the contacts, to force the said locking device into its disengaged relation with the parts with which the switch-blade is connected. Figs. 8 and 9 are perspective views of two of the actuating cam-arms employed with the other parts of the circuit-controller. Fig. 10 is a detail horizontal sectional representation of the contacts, said section being taken on line 10 10 in Fig. 5; and Fig. 11 is a longitudinal sectional representation of the switch-blade and a portion of an arm to which it is attached. Figs. 12 and 13 are a side and plan view, respectively, of a modified arrangement of such actuating-arms whereby the switch-blade can be made to make and break more than a double electrical connection with the contacts during one revolution of the shaft or spindle on which said arms are arranged.

Similar characters of reference are employed in the above-described views to indicate corresponding parts.

Referring now to the several figures of the drawings, the reference character 1 indicates the complete single-pole circuit-controller, the same comprising a suitable base 2 of any desirable insulating material—such as wood, slate, or the like—and upon which are secured, by means of screws 4 or other fastening means, a pair of supporting brackets or standards 3. Arranged between these brackets or standards are suitably-disposed rods 5, 6, and 7, having their ends suitably connected with the respective brackets or standards, and 8 indicates a shaft or spindle which is rotatively arranged in bearings 9, connected with the said standards or brackets 3. Upon one end of the said shaft or spindle 8 is secured a suitable gear 10, which is in mesh with a worm 11, arranged upon a spindle 12. This spindle is rotatively arranged in bearings 13, connected, preferably, with one of the brackets or standards 3, substantially as illustrated. The said spindle 12 is provided with a pulley 14, preferably a grooved wheel, as illustrated, over which passes a belt 15, operated from the driving-wheel of an electric motor 16. Of course it will be understood that in place of revolving the shaft or spindle 8 indirectly from the worm 11 and spindle 12 said shaft or spindle 8 may be driven directly from the said motor 16 or from any other source of motive power. Suitably secured upon the said shaft or spindle 8, so as to turn with the same, but capable of lateral as well as rotative adjustment upon the said shaft, are a pair of sleeves 17 and 18, the sleeve 17 being provided with an arm 19 and the sleeve 18 being provided with an arm 20. Upon the hub portion or sleeve 17 is adjustably arranged another arm 21, secured thereto, preferably, by means of the strap portions 22 and 23 and the screws 24, and the arm 21 being provided at its free end portion with a laterally-extending projection, as 25, which is in alinement with the edge of the arm 19. In a like manner I have adjustably arranged upon the hub portion or sleeve 18 an arm 26, which is secured thereto, preferably, by means of strap portions and screws similar to those employed with the arm 20, the said arm 26 being provided at its free end portion with a laterally-extending projection, as 27, which is in alinement with the edge of the arm 20.

Arranged upon the rod 6 between a pair of sleeves 28 and 29 upon said rod or in any other suitable manner is another sleeve or hub 30, which is provided with three radially-extending arms or members 31, 32, and 33 and with an extension or hook-shaped portion 34, forming a holding member, substantially as illustrated in the several figures of the drawings. A spring 35, attached at one end to the rod 7 and at its other end to the said arm or member 32, normally retains the said sleeve or hub 30 and its arms or members in the position indicated in Fig. 5 of the drawings, with the member or arm 31 forced between a pair of spring-arms 36, forming a cushion or stop, and which are suitably attached, by means of screws 37 or other fastening means, to a cross piece or bar 38, secured between the brackets or standards 3, substantially in the manner represented in the drawings. As illustrated, the said arm or member 31 is in alinement with the rotary arm 19 and also with the extension 25 upon the arm 21, substantially as and for the purposes to be hereinafter more particularly specified.

The arm or member 33 is provided with the switch-blade 39, which consists, essentially, of a piece of copper or other metal which is a good conductor of electricity, the switch-blade being made of the proper length and being preferably doubled upon itself, as at 40, having its respective end portions arranged against insulating-pieces 41 on opposite sides of the arm or member 33 and being secured in position by means of insulated screws or bolts 42, as clearly illustrated in Fig. 11 of the drawings. The doubled-over portions 40 of the blade 39 may be suitably secured together by means of rivets 43 or other fastening means.

Suitably secured upon the rod 5 is a sleeve 44, provided with an arm 45 and an offset or holding portion 46, the said arm 45 extending directly above and being in alinement with the arm or member 32, the said arm 45 also having at its free end a laterally-extending pin 47, to which is attached the one end of a spring 48, said spring 48 having its other end secured to the rod 47, and the tension of said spring 48 causing the portion 49 of said arm 45 when the parts of the apparatus are in their normal initial positions (indicated in Fig. 5 of the drawings) to rest directly in slidable engagement with the upper edge of the hook-shaped portion 34 of the arm or member 31, and said offset or holding portion 46 being capable of dropping into holding or locked engagement with said hook-shaped portion 34 when the parts are in the positions indicated in Figs. 6 and 7, substantially as and for the purposes to be presently described. The said sleeve 44 is preferably arranged between a pair of other sleeves 50 and 51 on said rod 5, substantially as illustrated.

The sleeve 44 is also provided with a rearwardly-extending arm 52, which is in alinement with the arm 20 and the projection 27 of the arm 26.

Referring now more particularly to Figs. 2, 5, 6, and 7, it will be noticed that there is secured to a cross-bar or plate 53, connected with the end supports or standards 3 by means of screws 54 or other suitable fastening devices, a plate, bar, block, or other device 55 of slate or any other insulating material. To this plate, bar, block, or other insulating device 55 has been secured in the manner to be presently described a pair of electrical contacts 56 and 57. Each contact 56 or 57 comprises a pair of spring-arms 58, the connecting portion 59 between said arms 58 being bent substantially in the manner illustrated in Fig. 10 of the drawings, and being arranged against a member 61 of a yoke 60, which is placed over the upper or lower edge of the said plate, bar, or block 55. Each yoke 60 is also provided with a member 62, the said members 62 and 61 of each yoke, the plate, bar, or block 55, the connecting portions 59 of the respective contacts 56 and 57 being provided with suitable holes or perforations which register with each other for the reception of screws 63, which are arranged in the said holes or perforations and are screwed into correspondingly-placed screw-holes in certain holding blocks or plates 64, made to conform with the inner contour of the connecting portions 59 of the arms 58 of each contact 56 and 57 to secure said contacts in place for the reception of the switch-blade between the spring-arms of the contacts when electrical connection is to be completed. Each member 62 of each yoke 60 is also provided with a binding-screw 65 for the attachment thereto in the usual manner of circuit-wires in which the electric lights are placed. From an inspection of said Fig. 10 it will readily be seen that if for some reason the contacts 56 and 57 should be rendered inoperative and useless the screws 63 can be quickly removed and the holding-blocks 64 and contacts detached to be readily replaced with other contacts, which are secured in position by means of the said blocks 64 and the screws 63.

Although I have illustrated and described in the present case but one single make-and-break device for a circuit-controller, it will be clearly evident that any suitable number of make-and-break devices and correspondingly-arranged switch-blades and contacts may be employed with an apparatus or device embodying the principles of my present invention to produce various illuminating and scenic effects. In that case instead of the employment of a short block 55, to which the contacts are secured, I may use a long bar in lieu thereof, the said bar extending, preferably, over its entire length between the end standards or supports 3 of the apparatus. It will also be evident that the switch blades or blade may be made to variously make and break electrical connection with the contacts connected with the said plate, block, or bar 55 by increasing the number of adjustably-arranged arms or levers upon the shaft or spindle 8, and these various arms or levers may be secured directly upon said shaft or spindle 8, as clearly illustrated in Figs. 12 and 13 of the drawings. In said Figs. 12 and 13 I have represented one arrangement of such arms, the said shaft or spindle 8 having secured thereto three arms or levers 66, 67, and 68, the arms 67 and 68 being respectively provided with laterally-extending projections 69 and 70, the arm 66 and projections 69 and 70 being adapted to be brought in slidable engagement with the arm 31 to produce electrical connection, while another set of arms or levers 71, 72, and 73, also secured upon said shaft or spindle 8, and said arms 72 and 73 being respectively provided with laterally-extending projections 74 and 75 are arranged intermediate of the respective arms 66, 67, and 68 to be brought in slidable engagement with the arm 52, whereby the previously-made electrical connection is again interrupted or broken.

The operation of the parts of the circuit-controller briefly is as follows: The normal initial positions of the various parts of the circuit-controller are clearly illustrated in Fig. 5 of the drawings. Now suppose the shaft or spindle 8 is being revolved in the direction of the arrow $y$ in said Fig. 5. The immediate result will be that the arm 19 engages the arm 31, thereby bringing the parts in the positions indicated in Fig. 6 of the drawings, the switch-blade having made electrical connection with the contacts 56 and 57, whereby the electric circuit is completed. At the same time the spring 48 has forced the arm 45 in its holding or locked engagement with the portion 46 of the arm 31, whereby the switch-blade is positively retained between the arms 58 of the said contacts 56 and 57, as illustrated and as will be clearly understood from the foregoing description. During the rotary motion of the shaft or spindle 8 the arm 20 is next brought in engagement with the arm 52, as indicated in Fig. 7 of the drawings, whereby the arm 45 is raised from its holding engagement with the portion 46 of the arm 31, and the spring 35, connected with the arm 32, at once returns all the parts to their normal initial positions, (represented in said Fig. 5,) thereby removing the switch-blade from its electrical connection with the contacts 56 and 57 and interrupting or breaking the electrical circuit, as will be clearly understood. In like manner during the rotary movements of the shaft or spindle 8 the extension 25 of the arm 21 is brought against the arm 31 and the extension upon the arm 26 is brought against the arm 52, substantially in the manner and for the purposes hereinabove set forth. By increasing the number and arrangement of the arms upon the shaft or spindle 8, as illustrated in Figs. 12 and 13, any number of electric makes and breaks between the switch-blade and the contacts 56 and 57 may be made.

From the previous description it will be obvious that by means of the number and the adjustable arrangements of the cam arms or levers upon the shaft or spindle 8 any number of different combinations may be made for causing the illumination of the different letters of a sign or for producing other illuminated effects, such as the cutting in and out of variously-colored lights.

I am aware that some changes may be made in the various arrangements and combinations of the parts, as well as in the details of the construction thereof, without departing from the scope of my present invention. Hence I do not limit my invention to the exact arrangements and combinations of the parts as described in the foregoing specification and as illustrated in the accompanying drawings, nor do I confine myself to the exact details of the construction of the said parts.

Having thus described my invention, what I claim is—

1. A circuit-controller comprising an arrangement of brackets or supports, an insulated connecting-bar between the same, single-pole contacts on said bar, a shaft, a series of make and break arms on said shaft, an oscillating arm and a switch-blade on said oscillating arm and with which the make-arms on said shaft are adapted to be brought in slidable engagement, a second oscillating arm with which the break-arms on said shaft are adapted to be brought in slidable engagement, and a holding means between the said oscillating arms for positively retaining said switch-blade in electrical connection with said single-pole contacts during the time of electrical contact, substantially as and for the purposes set forth.

2. A circuit-controller comprising an arrangement of brackets or supports, an insulated connecting-bar between the same, single-pole contacts on said bar, a shaft, a series of make and break arms on said shaft, an oscillating arm and a switch-blade on said oscillating arm and with which the make-arms on said shaft are adapted to be brought in slidable engagement, a second oscillating arm with which the break-arms on said shaft are adapted to be brought in slidable engagement, and a holding means between the said oscillating arms for positively retaining said switch-blade in electrical connection with said single-pole contacts during the time of electrical contact, consisting, essentially, of a hook portion on one of said oscillating arms and an offset upon the other oscillating arm, substantially as and for the purposes set forth.

3. A circuit-controller comprising an arrangement of brackets or supports, an insulated connecting-bar between the same, single-pole contacts on said bar, a shaft, a series of make and break arms on said shaft, a spring-controlled oscillating arm and a switch-blade on said oscillating arm and with which the make-arms on said shaft are adapted to be brought in slidable engagement, a second spring-controlled oscillating arm with which the break-arms on said shaft are adapted to be brought in slidable engagement, and a holding means between said oscillating arms for positively retaining said switch-blade in electrical connection with said single-pole contacts during the time of electrical contact, substantially as and for the purposes set forth.

4. A circuit-controller comprising an arrangement of brackets or supports, an insulated connecting-bar between the same, single-pole contacts on said bar, a shaft, a series of make and break arms on said shaft, a spring-controlled oscillating arm and a switch-blade on said oscillating arm and with which the make-arms on said shaft are adapted to be brought in slidable engagement, a second spring-controlled oscillating arm with which the break-arms on said shaft are adapted to be brought in slidable engagement, and a holding means between said oscillating arms for positively retaining said switch-blade in electrical connection with said single-pole contacts during the time of electrical contact, consisting, essentially, of a hook portion on one of said oscillating arms and an offset upon the other oscillating arm, substantially as and for the purposes set forth.

5. A circuit-controller comprising an arrangement of brackets or supports, an insulated connecting-bar between the same, single-pole contacts 56 and 57, each contact consisting of a pair of spring-arms 58 and a connecting portion 59, and means for attaching said contacts to said insulated connecting-bar, consisting, of a yoke having members embracing the said insulated connecting-bar, a block arranged against the connecting portion 59 of each contact, and screws passed through said yoke members, the insulated connecting-bar, the connecting portions 59, and the blocks, substantially as and for the purposes set forth.

6. A circuit-controller comprising an arrangement of brackets or supports, an insulated connecting-bar between the same, single-pole contacts 56 and 57, each contact consisting of a pair of spring-arms 58 and a connecting portion 59, and means for attaching said contacts to said insulated connecting-bar, consisting, of a yoke having members embracing the said insulated connecting-bar, a block arranged against the connecting portion 59 of each contact, and screws passed through said yoke members, the insulated connecting-bar, the connecting portions 59, and the blocks, combined with a shaft, a series of make and break arms on said shaft, an oscillating arm and a switch-blade on said oscillating arm and with which the make-arms on said shaft are adapted to be brought in slidable engagement, a second oscillating arm with which the break-arms on said shaft are adapted to be brought in slidable engagement, and a holding means between said oscillating arms for positively retaining said switch-blade in electrical connection with said single-pole contacts during the time of electrical contact, substantially as and for the purposes set forth.

7. A circuit-controller comprising an arrangement of brackets or supports, an insulated connecting-bar between the same, single-pole contacts 56 and 57, each contact consisting of a pair of spring-arms 58 and a connecting portion 59, and means for attaching said contacts to said insulated connecting-bar, consisting, of a yoke having members embracing the said insulated connecting-bar, a block arranged against the connecting portion 59 of each contact, and screws passed through said yoke members, the insulated connecting-bar, the connecting portions 59, and the blocks, combined with a shaft, a series of make and break arms on said shaft, an oscillating arm and switch-blade on said oscillating arm and with which the make-arms on said shaft are adapted to be brought in slidable engagement, a second oscillating arm with which the break-arms on said shaft are adapted to be brought in slidable engagement, and a holding means between said oscillating arms for positively retaining said switch-blade in electrical connection with said single-pole contacts during the time of electrical contact, consisting, essentially, of a hook portion on one of said oscillating arms and an offset upon the other oscillating arm, substantially as and for the purposes set forth.

8. A circuit-controller comprising an arrangement of brackets or supports, an insulated connecting-bar between the same, single-pole contacts 56 and 57, each contact consisting of a pair of spring-arms 58 and a connecting portion 59, and means for attaching said contacts to said insulated connecting-bar, consisting, of a yoke having members embracing the said insulated connecting-bar, a block arranged against the connecting portion 59 of each contact, and screws passed through said yoke members, the insulated connecting-bar, the connecting portions 59, and the blocks, combined with a shaft, a series of make and break arms on said shaft, a spring-controlled oscillating arm and a switch-blade on said oscillating arm and with which the make-arms on said shaft are adapted to be brought in slidable engagement, a second spring-controlled oscillating arm with which the break-arms on said shaft are adapted to be brought in slidable engagement, and a holding means between said oscillating arms for positively retaining said switch-blade in electrical connection with the single-pole contacts during the time of electrical contact, substantially as and for the purposes set forth.

9. A circuit-controller comprising an arrangement of brackets or supports, an insulated connecting-bar between the same, single-pole contacts 56 and 57, each contact consisting of a pair of spring-arms 58 and a connecting portion 59, and means for attaching said contacts to said insulated connecting-bar, consisting, of a yoke having members embracing the said insulated connecting-bar, a block arranged against the connecting portion 59 of each contact, and screws passed through said yoke members, the insulated connecting-bar, the connecting portions 59, and the blocks, combined with a shaft, a series of make and break arms on said shaft, a spring-controlled oscillating arm and a switch-blade on said oscillating arm and with which the make-arms on said shaft are adapted to be brought in slidable engagement, a second spring-controlled oscillating arm with which the break-arms on said shaft are adapted to be brought in slidable engagement, and a holding means between said oscillating arms for positively retaining said switch-blade in electrical connection with the single-pole contacts during the time of electrical contact, consisting, essentially, of a hook portion on one of said oscillating arms and an offset upon the other oscillating arm, substantially as and for the purposes set forth.

10. A circuit-controller comprising an arrangement of brackets or supports, an insulated connecting-bar between the same, single-pole contacts on said bar, a shaft, a sleeve on said shaft and an arm extending from said sleeve, a second arm adjustably arranged upon said sleeve, said second arm being provided with a projection, a second sleeve on said shaft, and an arm extending from said second sleeve, another arm adjustably arranged upon said second sleeve, said arm being provided with a projection, an oscillating arm and a switch-blade on said oscillating arm and with which the two arms on the first-mentioned sleeve are adapted to be alternately brought in slidable engagement, a second oscillating arm with which the two arms on said second-mentioned sleeve are adapted to be brought alternately in slidable engagement, and a holding means between said oscillating arms for positively retaining said switch-blade in electrical connection with said single-pole contacts during the time of electrical contact, substantially as and for the purposes set forth.

11. A circuit-controller comprising an arrangement of brackets or supports, an insulated connecting-bar between the same, single-pole contacts on said bar, a shaft, a sleeve on said shaft and an arm extending from said sleeve, a second arm adjustably arranged upon said sleeve, said second arm being provided with a projection, a second sleeve on said shaft, and an arm extending from said second sleeve, another arm adjustably arranged upon said second sleeve, said arm being provided with a projection, an oscillating arm and a switch-blade on said oscillating arm and with which the two arms on the first-mentioned sleeve are adapted to be alternately brought in slidable engagement, a second oscillating arm with which the two arms on said second-mentioned sleeve are adapted to be alternately brought in slidable engagement, and a holding means between said oscillating arms for positively retaining said switch-blade in electrical connection with said single-pole contacts during the time of electrical contact, consisting, essentially, of a hook portion on one of said oscillating arms, and an offset upon the other oscillating arm, substantially as and for the purposes set forth.

12. A circuit-controller comprising an arrangement of brackets or supports, an insulated connecting-bar between the same, single-pole contacts on said bar, a shaft, a sleeve on said shaft and an arm extending from said sleeve, a second arm adjustably arranged upon said sleeve, said second arm being provided with a projection, a second sleeve on said shaft, and an arm extending from said second sleeve, another arm adjustably arranged upon said second sleeve, said arm being provided with a projection, a spring-controlled oscillating arm and a switch-blade on said oscillating arm with which the two arms on the first-mentioned sleeve are adapted to be alternately brought in slidable engagement, a second spring-controlled oscillating arm with which the two arms on said second-mentioned sleeve are adapted to be alternately brought in slidable engagement, and a holding means between said oscillating arms for positively retaining said switch-blade in electrical connection with said single-pole contacts during the time of electrical contact, substantially as and for the purposes set forth.

13. A circuit-controller comprising an arrangement of brackets or supports, an insulated connecting-bar between the same, single-pole contacts on said bar, a shaft, a sleeve on said shaft and an arm extending from said sleeve, a second arm adjustably arranged upon said sleeve, said second arm being provided with a projection, a second sleeve on said shaft, and an arm extending from said second sleeve, another arm adjustably arranged upon said second sleeve, said arm being provided with a projection, a spring-controlled oscillating arm and a switch-blade on said oscillating arm and with which the two arms on the first-mentioned sleeve are adapted to be alternately brought in slidable engagement, a second spring-controlled oscillating arm with which the two arms on said second-mentioned sleeve are adapted to be brought alternately in slidable engagement, and a holding means between said oscillating arms for positively retaining said switch-blade in electrical connection with said single-pole contacts during the time of electrical contact, consisting, essentially, of a hook portion on one of said oscillating arms, and an offset upon the other oscillating arm, substantially as and for the purposes set forth.

14. A circuit-controller comprising an arrangement of brackets or supports, an insulated connecting-bar between the same, single-pole contacts on said bar, an oscillating arm, and a switch-blade connected with said oscillating arm, said switch-blade consisting of members doubled upon themselves, insulating-pieces arranged on opposite sides of said oscillating arm, and means for securing the end portions of said switch-blade members against said insulating-pieces, substantially as and for the purposes set forth.

15. A circuit-controller comprising an arrangement of brackets or supports, an insulated connecting-bar between the same, single-pole contacts on said bar, an oscillating arm, and a switch-blade connected with said oscillating arm, said switch-blade consisting of members doubled upon themselves, insulating-pieces arranged on opposite sides of said oscillating arm, means for securing the end portions of said switch-blade members against said insulating-pieces, and means for actuating said oscillating arm whereby said switch-blade is caused to make electrical connection with said single-pole contacts, substantially as and for the purposes set forth.

16. A circuit-controller comprising an arrangement of brackets or supports, an insulated connecting-bar between the same, single-pole contacts on said bar, an oscillating arm, and a switch-blade connected with said oscillating arm, said switch-blade consisting of members doubled upon themselves, insulating-pieces arranged on opposite sides of said oscillating arm, means for securing the end portions of said switch-blade members against said insulating-pieces, and means for actuating said oscillating arm whereby said switch-blade is caused to make electrical connection with said single-pole contacts, consisting, of a shaft, a series of make and break arms on said shaft, the make-arms being adapted to be brought in slidable engagement with said switch-blade-carrying arm, a second oscillating arm with which said break-arms are adapted to be brought in slidable engagement, and a holding means between said oscillating arms for positively retaining said switch-blade in its electrical connection with said single-pole contacts during the time of electrical contact, substantially as and for the purposes set forth.

17. A circuit-controller comprising an arrangement of brackets or supports, an insulated connecting-bar between the same, single-pole contacts on said bar, a shaft, a series of make and break arms on said shaft, an oscillating arm and a switch-blade on said oscillating arm and with which the make-arms on said shaft are adapted to be brought in slidable engagement, a second oscillating arm with which the break-arms on said shaft are adapted to be brought in slidable engagement, a holding means between the said oscillating arms for positively retaining the switch-blade in electrical connection with said single-pole contacts during the time of electrical contact, and a cushioning device against which the switch-blade-carrying arm is brought when said switch-blade is disengaged from said single-pole contacts, substantially as and for the purposes set forth.

18. A circuit-controller comprising an arrangement of brackets or supports, an insulated connecting-bar between the same, single-pole contacts on said bar, a shaft, a series of make and break arms on said shaft, an oscillating arm and a switch-blade on said oscillating arm and with which the make-arms on said shaft are adapted to be brought in slidable engagement, a second oscillating arm with which the break-arms on said shaft are adapted to be brought in slidable engagement, a holding means between the said oscillating arms for positively retaining the switch-blade in electrical connection with said single-pole contacts during the time of electrical contact, and a cushioning device consisting, essentially, of a pair of spring-arms between which the switch-blade-carrying arm enters when the switch-blade is disengaged from said single-pole contacts, and between which spring-arms the said switch-carrying arm is held by frictional contact, substantially as and for the purposes set forth.

In testimony that I claim the invention set forth above I have hereunto set my hand this 18th day of January, 1904.

PAUL H. JAEHNIG.

Witnesses:
 FREDK. C. FRAENTZEL,
 GEO. D. RICHARDS.